J. D. RUSS.
CHECK VALVE FOR INTERNAL COMBUSTION ENGINES.
APPLICATION FILED AUG. 17, 1912.
1,065,552.
Patented June 24, 1913.
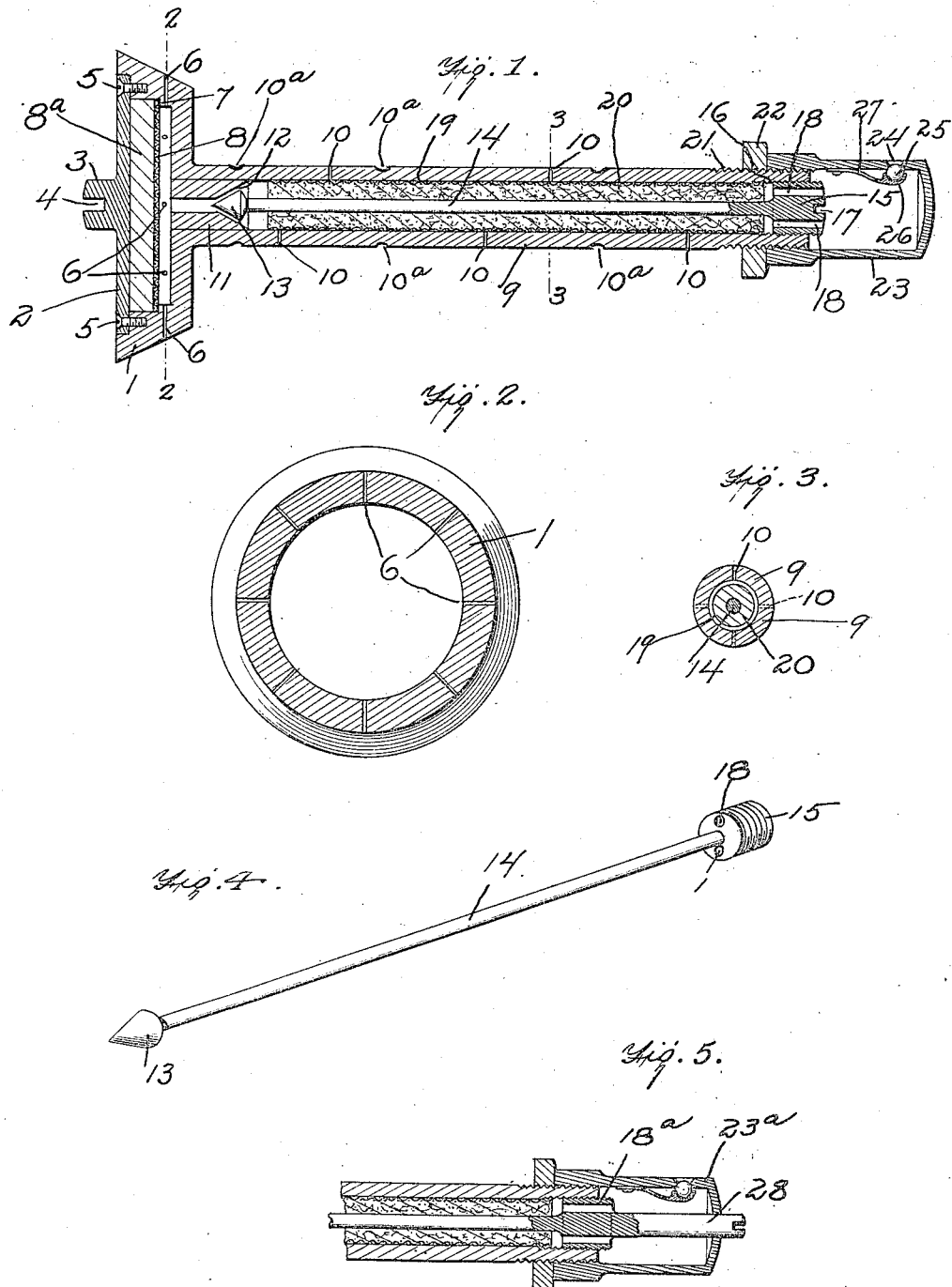

UNITED STATES PATENT OFFICE.

JOHN D. RUSS, OF SPENCER, WEST VIRGINIA.

CHECK-VALVE FOR INTERNAL-COMBUSTION ENGINES.

1,065,552.  Specification of Letters Patent.   Patented June 24, 1913.

Application filed August 17, 1912.  Serial No. 715,612.

*To all whom it may concern:*

Be it known that I, JOHN D. RUSS, a citizen of the United States, residing at Spencer, in the county of Roane and State of West Virginia, have invented new and useful Improvements in Check-Valves for Internal-Combustion Engines, of which the following is a specification.

As is well known, a serious difficulty experienced with the inlet and exhaust check-valves of internal-combustion engines is the fact that they frequently stick, thus impairing and making uncertain the perfect operation of the engine. Check-valves, as commonly used in internal-combustion engines, are provided with a relatively long stem, which works in a long bearing, and it is in this bearing that considerable friction and consequent sticking arise. The head, or valve proper, also has a tendency to stick in its valve-seat.

One of the objects, therefore, of my invention is to provide a self-containing lubricating-valve, especially adapted for use as a check-valve in internal-combustion engines, which will be simple in construction, and absolutely efficient in operation, eliminating all sticking of the valve and valve-stem.

The invention comprehends a valve peculiarly constructed whereby its stem, as well as its head, or valve proper, is maintained in a condition of perfect lubrication; and another object of the invention is to provide means, novel in construction and simple and practical in operation, whereby the amount of lubricating matter admitted to the head, or valve proper, from the source of self-contained lubricant-supply in the valve-stem, may be regulated or adjusted at will.

Another object of the invention is to provide safety means for preventing the valve becoming entirely disengaged from its bearing and dropping into the engine-cylinder while being cleaned, or the like.

Another object of the invention is to construct the valve-head, or valve proper, in a novel manner, whereby it may be easily cleaned.

Further objects of advantageous improvement will appear as the specification proceeds and the nature of the invention more fully appears.

The invention is graphically illustrated in the accompanying drawing, forming part of my specification, and illustrating an embodiment of the invention susceptible of carrying out the underlying principles thereof.

In this drawing, in which like reference-characters denote corresponding parts throughout the several views: Figure I is a central, longitudinal, sectional view through a check-valve constructed in accordance with my invention; Fig. II is a section on the line 2—2, Fig. I; Fig. III is a section on the line 3—3, Fig. I; Fig. IV is a detached, detail, perspective view of the needle valve; and Fig. V is a fragmentary sectional view of a portion of a slightly modified form of valve.

Referring, now, in detail to the drawing: 1 designates the check-valve head, or check-valve proper, which is constructed hollow, as shown, and with an open top, normally closed by a cap 2. This cap may, if desired, be screwed into the top of the valve head 1, in which case it is provided with a central, projecting boss 3 provided with a screw-driver groove 4, or it may be secured to the valve-head by screws 5, as shown.

Extending through the side wall of the valve-head 1, near the bottom of the internal chamber therein, is a series of holes 6, through which lubricant may escape from interiorly of the valve outward to the valve-seat engaged by the valve 1.

Above the series of holes 6, the valve 1 is provided interiorly, at a point considerably below the top of said internal chamber, with a circular ledge 7, on which is seated a disk 8, of foraminous material. The disk 8 thus divides said internal chamber into two sections, an upper and a lower one. In the upper section (that is, between said disk 8 and the cap 2) may be placed a wick 8ª, of any suitable substance, such as graphite and oil, brass-gauze, or other heat-resisting substance, or the like.

9 is the valve-stem, constructed hollow, as shown, the bore communicating with the internal chamber of the valve 1. The valve-stem is provided with a plurality of holes 10 extending transversely through the wall thereof, whereby lubricant is supplied from the interior of the valve-stem outward to the bearing in which said stem works or reciprocates. The valve-stem may, also, be provided with shallow, circumferential grooves 10ª, to hold oil and, also, to catch therein any foreign, gritty matter which would tend to set up friction.

At the head of the valve-stem 9, in the bore thereof, is disposed a centrally-apertured, cylindrical plug 11, preferably suitably detachably secured to said stem, and provided, at its lower end, with an approximately cone-shaped portion 12, constituting a valve-seat, adapted to be engaged by a needle-valve 13, having a stem 14, terminating, at the other end, in an enlargement or butt 15 exteriorly threaded, as shown, for engagement with the interiorly-threaded end portion 16 of the valve-stem 9. The butt 15 is provided with a screw-driver slot or groove 17, by which the butt may be screwed inward or outward with respect to the stem 9, and thus the needle-valve 13 adjusted toward or away from its seat 12, to admit from the valve-stem 9 into the head 1 as much, or as little, lubricant, as may be desired. The butt 15 is provided with a plurality of longitudinally-extending, eccentrically-disposed holes 18 extending therethrough, for the passage of lubricant.

Disposed in the bore of the stem 9 is an open-ended cylinder 19, of foraminous material, containing a wick 20, of any suitable material, such as graphite and oil. By means of this cylinder, the wick, contained therein, may be removed bodily with a maximum of ease and celerity. The needle-valve stem 14 projects through said wick.

The end of the valve-stem 9 opposite the head 1 is provided with an exteriorly-threaded portion 21, on which is screwed a safety ring 22, which prevents the valve becoming entirely disengaged from its bearing and thus dropping into the engine-cylinder, when the valve is being cleaned, or the like; since, as is obvious, the ring engages the wall of the engine-cylinder and prevents further inward movement of the valve-stem 9. Also screwed on the threaded portion 21 is a hollow cap 23, constituting an oil-well or reservoir, provided with an oil-filling aperture 24 normally closed by a ball-valve 25 engaged by the cup-shaped end 26 of a leaf-spring 27 secured to the interior surface of the wall of said reservoir 23. It will be noticed that the ball 25 and its spring 27 constitute a valve, which automatically closes as soon as the filling-nozzle of an oil-can, or the like, is withdrawn from the hole 24, after filling said oil-reservoir.

Referring, now, to Fig. 5, showing a slightly-modified form: This is practically the same construction as shown in the preceding figures of the drawing. The only difference is that the butt 18ª has a stem 28, which projects through the end wall of the oil-reservoir 23ª, whereby the needle-valve may be adjusted, without having previously to remove the oil-reservoir 23ª, as is necessary with the device of the preceding figures.

It will be observed that, by making the valve-head and the valve-stem both hollow, a very light structure is the result; so that the valve is capable of very quick work, as there is not so much dead weight, hence less inertia, to overcome, and the valve will seat and release much more easily than valves which are made solid. This makes the working of my valve at high speed much more certain, even with weaker valve-springs.

My valve is also of great value in the large type of gas-engines, as the lubricating and cleaning of the valve can be accomplished without taking the engine down, because my internal lubricating system makes it possible to clean the valve-seat without removing the valve.

In the old system of supplying the lubricant from outside the valve, the oil is soon sucked away from the valve-seat and stem; in my internal wick system, the oil lies in the interior of the stem and head, hence it is out of the line of suction, and moves out slowly, and surely lubricates the valve-stem and seat.

From the above description, taken in connection with the drawing, the many advantages of my invention will be apparent, especially to those skilled in the art to which the invention appertains.

I am aware that many modifications in detail may be resorted to from the specific structure herein described and illustrated with great particularity; but all such changes and modifications as come within the terms of the appended claims, constitute no departure from the spirit of the invention, and fall strictly within the scope and purview thereof.

Having thus fully described my invention, what I claim as new and desire to secure by Letters-Patent of the United States is:

1. A check-valve comprising a hollow head, a communicating hollow stem, a lubricant-wick disposed in said stem for feeding lubricant therethrough to said head, and a disk of foraminous material disposed within said head and dividing the same into two compartments.

2. A check-valve comprising a hollow head, a communicating hollow stem, a lubricant-wick disposed in said stem for feeding lubricant therethrough to said head, a disk of foraminous material disposed within said head and dividing the same into two compartments, and a body of heat-resisting material disposed in one of said compartments.

3. A check-valve, comprising a head and a stem, said stem being hollow and provided, at the end thereof toward said head, with an internal valve-seat, and a valve disposed within said hollow stem and engageable with said valve-seat, and having a stem provided with a butt at the end thereof, said butt engaging the interior surface of the wall of said first-mentioned stem, and being provided with longitudinally-extending holes therethrough.

4. A check-valve, comprising a head and a stem, said stem being hollow and provided, at the end thereof toward said head, with an internal valve-seat, a valve disposed within said hollow stem and engageable with said valve-seat, and having a stem provided with a butt at the end thereof, said butt engaging the interior surface of the wall of said first-mentioned stem, and being provided with longitudinally-extending holes therethrough, and a hollow, oil-reservoir cap disposed on the end of said first-mentioned stem.

5. A check-valve, comprising a head and a stem, said stem being hollow and provided, at the end thereof toward said head, with an internal valve-seat, a valve disposed within said hollow stem and engageable with said valve-seat, and having a stem provided with a butt at the end thereof, said butt engaging the interior surface of the wall of said first-mentioned stem, and being provided with longitudinally-extending holes therethrough, and a hollow, oil-reservoir cap screwed on the end of said first-mentioned stem.

6. A check-valve, comprising a head and a stem, said stem being hollow and provided, at the end thereof toward said head, with an internal valve-seat, a valve disposed within said hollow stem and engageable with said valve-seat, and a wick also disposed in said hollow stem.

7. A check-valve, comprising a head and a stem, said stem being hollow and provided, at the end thereof toward said head, with an internal valve-seat, a valve disposed within said hollow stem and engageable with said valve-seat, an open-ended cylinder, of foraminous material, disposed within said hollow stem, and a wick disposed within said cylinder.

In testimony whereof I have hereunto set my hand in presence of two subscribing witnesses.

JOHN D. RUSS.

Witnesses:
   WIRT N. RUSS,
   G. T. SARVER.